United States Patent
Spangemacher

[15] 3,685,579

[45] Aug. 22, 1972

[54] COOLING TOWER SYSTEM

[72] Inventor: Kurt Spangemacher, Wasserburg Inn, Germany

[73] Assignee: Maschinenbau-Aktiengesellschaft Balcke, Bochum, Germany

[22] Filed: Aug. 10, 1970

[21] Appl. No.: 62,456

[30] Foreign Application Priority Data

Aug. 8, 1969  Germany.........P 19 40 052.3

[52] U.S. Cl............................165/122, 261/DIG. 11
[51] Int. Cl...........................................F24h 3/06
[58] Field of Search.............165/106, 122; 261/151 X, DIG 11; 62/305

[56] References Cited

UNITED STATES PATENTS 3,495,655  2/1970  Fordyce....................165/122
3,154,140  10/1964  Esselman et al...........165/106
3,423,078  1/1969  May......................261/151 X
3,384,165  5/1968  Mathews..................165/122

FOREIGN PATENTS OR APPLICATIONS 900,179  7/1962  Great Britain.............165/122

*Primary Examiner*—Frederick L. Matteson
*Assistant Examiner*—Theophil W. Streule
*Attorney*—Walter Becker

[57] ABSTRACT

A cooling tower system which comprises a dry cooling tower, according to which normally the medium to be cooled is passed through a dry cooling tower cooled by atmospheric air, and in which in response to said atmospheric air exceeding a certain temperature, a portion of the cooling medium to be cooled is conveyed to a water-cooled tower to be cooled thereby.

9 Claims, 3 Drawing Figures

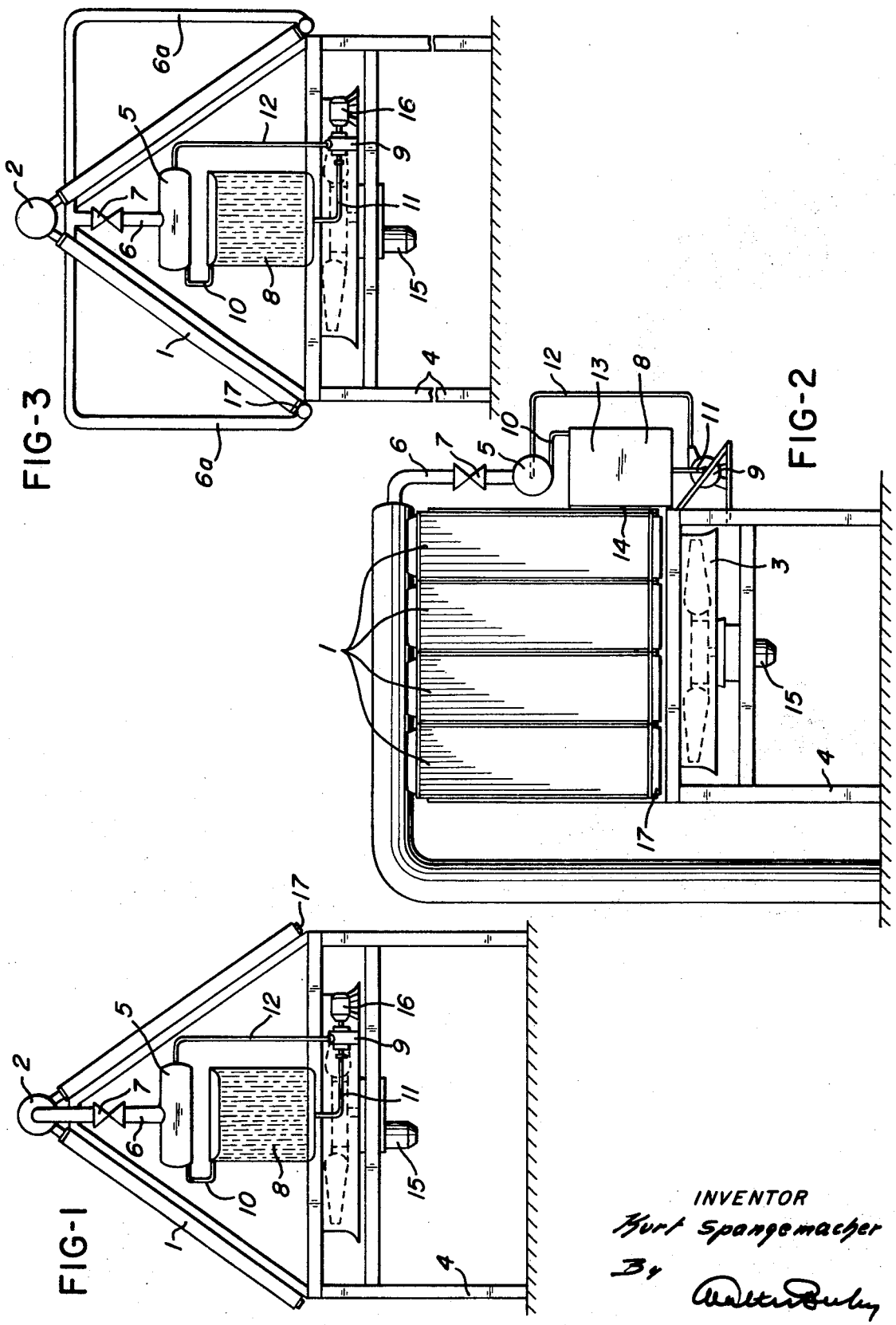

COOLING TOWER SYSTEM

The present invention relates to increasing the output of a dry cooling tower at high air temperatures. Air cooled heat transfer means according to which atmospheric air serving as cooling medium is conveyed by means of blowers or by the draft in a chimney or the like are used more and more due to the lack of water. The output of such dry cooling towers decreases considerably at high air temperatures in view of its steep characteristic because the temperature of the product to be cooled increases linearly with the temperature of the air. In connection with the operation of a power plant this means that the condensation pressure increases whereby the specific steam consumption likewise increases. If the operation of a power plant with peak output has also to be maintained at high air temperatures, it is necessary to design the boiler and the turbine for a higher output than would normally be necessary. Frequently, the dry cooling tower is dimensioned in conformity with the maximum temperature of the air. In other words, the dry cooling tower must, in view of a few hours of operation at peak temperatures, be dimensioned larger than would be necessary for the operation of the tower during the remaining time.

It is known to reduce the peak temperatures of the air by injecting water into the cooling air. This method is based on conditions applying to the average U. S. latitudes where at high air temperatures the relative air humidity is relatively low. The relative air humidity amounts to approximately 40percent at an air temperature of 30° C and amounts to approximately 50 percent at an air temperature of 30° C. By injecting water, the air temperature can be cooled from 30°C to 20° C and from 25° °C to 19° C. The cooling limit temperature which represents the theoretically obtainable temperature does not exceed a temperature of 20° C in central Europe. From these observations it will be evident that an air cooled installation with water injection will for a peak temperature of 30° C have to be designed only for a temperature of 22° C.

If ordinary water is injected into the cooling air, the substances dissolved in the water which do not evaporate will settle on the cooling surfaces, especially between the customarily employed cooling fins, and below the crusts thus formed corrosion occurs which leads to a premature wear. Furthermore, the heat transfer into the cooling surfaces is affected and the passage of air decreases in view of the flow cross-section being reduced by the deposits so that also the output of the installation will decrease. In unfavorable instances, the beneficial effect to be realized by the injection of water is thus turned into the opposite.

These drawbacks are not overcome by the use of soft water. Merely when using desalted water, a proper operation may be expected. However, desalting installations which have to be designed for peak consumption during hot summer days are extremely expensive even if by an accumulation of greater quantities their output can be reduced.

It it, therefore, an object of the present invention to provide a dry cooling tower which will overcome the above referred to drawbacks so that also at increased air temperatures a proper operation of the cooling tower will be assured without a decrease in the output and without requiring high investments.

This object and other objects and advantages of the invention will appear more clearly from the following specification in connection with the accompanying drawing in which:

FIG. 1 is a front view of an air condensation installation of roof-shaped design according to the invention.

FIG. 2 illustrates a side view of the installation shown in FIG. 1.

FIG. 3 is a view representing slight modification over the device of FIG. 1.

The invention is characterized primarily in that a portion of the medium to be cooled is, in response to certain air temperatures being exceeded, cooled in a water cooled heat transfer means instead of on the air cooled heat transfer surfaces while said portion is so dimensioned that the output will remain constant.

If, for instance, the air cooled heat transfer means is designed for a product-condensation temperature of 52° C at an outer air temperature of 22$^\infty$ C and an air discharge temperature of 37° C, its output would at an air temperature of 30° C have to be reduced to 74 percent. The remaining 26 percent are taken over by the water cooled heat transfer means which, in view of their high heat transfer factors and the additional high concentration, become very small.

If the dry cooling tower is operated as condenser and if the medium to be cooled is steam, it is provided according to the invention that the steam to be condensed is first passed through the air cooled heat transfer means and subsequently is conveyed through a serially arranged water cooled auxiliary condenser. According to the invention it is also possible to pass a portion of the steam to be condensed directly into a water cooled auxiliary condenser and to convey the main portion through the dry cooling tower. That portion of the steam to be condensed which is conveyed into the water cooled auxiliary condenser may, according to the invention, be a partial flow branched off from the main steam. In a special instance which may occur when employing the invention in power plants, is is provided according to the invention that the steam flow introduced into the water cooled auxiliary condenser is steam tapped from a turbine prior to the last stage thereof. As a result thereof, the installation is on one hand reduced in size, and on the other hand also the last turbine stage is relieved which, especially at high air temperatures, is subjected to a considerable load.

If the dry cooling tower is employed for cooling a medium the state of aggregation of which will not change during the cooling step, the invention provides to branch off a partial flow of the medium and to convey the same into a water cooled heat transfer means, or to guide the medium to be cooled first through the dry cooling tower and subsequently through an auxiliary cooler arranged in series to the dry cooling tower. As cooling water for the wet cooling part there is, in conformity with the invention, employed well water or surface water. A preferred embodiment of the invention provides that circulatory water is employed as cooling water which circulatory water is recooled in a small cooling tower.

A baffle device according to the invention comprises a cooling insert over which the water trickles, which cooling insert is at the side of the cooling air arranged parallel to the dry heat transfer surfaces of the dry cooling tower while the water serves for cooling the auxiliary condenser or auxiliary cooler.

According to a further feature of the invention, the cooling insert as well as the auxiliary condenser and auxiliary cooler are at the end face arranged in front of the roof-shaped heat transfer surfaces of the cooling tower. The blower need not be designed greater because the slight reduction in the air throughflow at the dry heat transfer surfaces can be compensated for by a slight increase in the wet cooling parts.

It has proved expedient, in conformity with the invention, to provide control devices which will automatically open a valve when the pressure and the temperature of the medium to be cooled drop below a predetermined value. Through the said valve, when it is in open condition, there is conveyed a portion of the medium to be cooled and is conveyed to the water cooled cooling surfaces. Furthermore, in the cooling water circuit there is arranged a circulating pump which is turned-on simultaneously and acts upon the wet cooling part.

The installation has to be operated only in summer when the air temperature exceeds a certain value. A particular advantage of the method according to the invention consists in that the evaporation losses of the water are only half as high as the part which evaporates when, in conformity with the heretofore known practice, water is injected into the cooling air. The employment of ordinary only slightly treated additional water, as is customary with wet cooling towers, does not cause any difficulties and is, therefore, not objected to.

Referring now to the drawings in detail, the customarily employed design comprises air cooled condenser elements 1 with a steam feeding line 2 and the condensing chamber 17 for accumulating and discharging the condensate. The construction also comprises a blower 3 for conveying air which blower is driven by a motor 15. Furthermore, a construction of the above mentioned type includes supporting means 4. In addition to these known elements, at the end face in front of the dry cooling tower there is provided a water cooled auxiliary condenser 5 with a steam supply line 6 having arranged therein a shut-off or control valve 7. Therebelow is provided a water cooler 8 which through connecting lines 10, 11, 12 is in communication with the auxiliary condenser 5. In the connecting line 12 there is provided a circulating pump 9 with a motor 16.

When at high air temperatures the power drops, valve 7 is opened entirely or partially so that a portion of the steam will pass through conduit 6 into the auxiliary condenser 5. The pipes in the condenser 5 are passed through by cooling water which subsequently flows through conduit 10 into the wet cooler 8 where it trickles downwardly and is cooled by direct contact with the air. The cooled water passes through conduit 11, pump 9 and conduit 12 again into the cooling pipe of the auxiliary condenser 5. The air for the wet cooler is branched off from the main flow of air. The air warms up, is simultaneously humidified and escapes into the atmosphere.

If a construction with suction blowers or with natural draft is employed, the direction of flow of the air will be reversed. At the entrance to the water cooler there is provided a baffle device 14 the purpose of which consists in blocking the auxiliary air flow or at least in throttling the same when the auxiliary condenser is not in operation. The baffle device 14 may, for instance, be formed by a shutter which is opened and closed simultaneously with the valve 7. The baffle device 14 may, however, also comprise an auxiliary cooling element similar to the condenser element 1 which, for instance, serves for undercooling the condenser or the air or inert gases contained in the steam. If the additional condenser 5 is to be taken into operation together with the pertaining cooling circuit, the air of the auxiliary cooling element must additionally pass through the spray of the wet cooler. The thus increased resistance has to be taken into consideration when designing the installation.

According to another embodiment of the invention shown in FIG. 3, the dry cooling tower as condenser 1 is arranged in series with the auxiliary condenser 5. In this instance, the conduit 6 instead of being connected to the steam line 2, is connected to the somewhat larger condensing chamber 17. The further arrangement is the same as before. When opening the valve 7, a not yet condensed partial quantity of steam will flow from the condensing chamber 17 into the auxiliary condenser 5 which then will above all serve for cooling the air and inert gases contained in the steam and thus will relieve the auxiliary cooling element.

It is, of course, to be understood that the present invention is, by no means, limited to the particular showing in the drawing but also comprises any modifications within the scope of the appended claims.

What I claim is:

1. A cooling tower system, which includes: first main heat exchanger means provided with means for passing therethrough a medium to be cooled, first conduit means for conveying the medium to be cooled to said first heat exchanger means, said first heat exchanger means also including means to be engaged by atmospheric air for effecting a heat exchange between said atmospheric air and the medium to be cooled, second direct parallel connected heat exchanger means provided with means for passing therethrough a medium to be cooled, said second heat exchanger means also including means to be engaged by water for effecting a heat exchange between said water and the medium to be cooled, and second conduit means leading to and communicating with said second heat exchanger means for conveying at least a branch portion of the medium to be cooled to said second heat exchanger means.

2. A cooling tower system according to claim 1, in which said second conduit means branches off said first conduit means prior to the latter reaching said first main heat exchanger means.

3. A cooling tower system according to claim 1, in which said first conduit means and said first main heat exchanger means and said second conduit means and said second direct heat exchanger means follow each other in this sequence and are arranged in series with regard to each other.

4. A cooling tower system according to claim 1, in which said second conduit means includes a steam pipe, and in which said second direct beat exchanger means includes a water cooled condenser and a water cooled wet cooler.

5. A cooling tower system according to claim 4, which includes fluid circuit means comprising circulating pump means for circulating the water of said wet cooler for cooling said water cooled condenser.

6. A cooling tower system according to claim 5, in which said wet cooler and said water cooled condenser are located in front of said first main heat exchanger means.

7. A cooling tower system according to claim 1, in which said second conduit means includes a steam pipe leading to said second direct heat exchanger, and valve means is interposed in said steam pipe and is adapted selectively to be opened and closed.

8. A cooling tower system according to claim 4, which includes auxiliary cooling means associated with said water cooled wet cooler and operable to control cooling air for said wet cooler.

9. A cooling water system according to claim 7, in which said valve means is pressure responsive and operable in response to a set pressure for the medium to be cooled to open for conveying a portion of the medium to be cooled to said second direct heat exchanger means, hydraulic circuit means including a circulating pump associated with said second direct heat exchanger means and operatively connected to said valve means so as in response to the opening of said valve means to circulate cooling fluid through said second direct heat exchanger means.

* * * * *